US010087304B2

(12) United States Patent
Zhu et al.

(10) Patent No.: US 10,087,304 B2
(45) Date of Patent: Oct. 2, 2018

(54) COMPOSITION FOR PROTECTING BETA-CAROTENE

(71) Applicant: PolyOne—Shanghai, China, Shanghai (CN)

(72) Inventors: Ling Zhu, Shanghai (CN); Gang Li, Shanghai (CN); Wenyu Shang, Shanghai (CN)

(73) Assignee: PolyOne—Shanghai, China, Shanghai (CN)

( * ) Notice: Subject to any disclaimer, the term of this patent is extended or adjusted under 35 U.S.C. 154(b) by 691 days.

(21) Appl. No.: 14/425,132

(22) PCT Filed: Aug. 22, 2013

(86) PCT No.: PCT/CN2013/082031
§ 371 (c)(1),
(2) Date: Mar. 2, 2015

(87) PCT Pub. No.: WO2014/032539
PCT Pub. Date: Mar. 6, 2014

(65) Prior Publication Data

US 2015/0203655 A1 Jul. 23, 2015

(30) Foreign Application Priority Data

Aug. 30, 2012 (CN) .......................... 2012 1 0315827

(51) Int. Cl.
*C08K 5/00* (2006.01)
*B65B 43/00* (2006.01)
*B65B 55/00* (2006.01)

(52) U.S. Cl.
CPC .............. *C08K 5/005* (2013.01); *B65B 43/00* (2013.01); *B65B 55/00* (2013.01); *C08K 5/0041* (2013.01); *C08K 2201/014* (2013.01); *Y10T 428/1352* (2015.01)

(58) Field of Classification Search
CPC ...................................................... C08K 5/005
See application file for complete search history.

(56) References Cited

U.S. PATENT DOCUMENTS 6,228,910 B1 5/2001 Shakhnovich
7,291,184 B2 11/2007 Huber et al.
7,429,545 B2 9/2008 Lupia et al.
7,485,183 B2 2/2009 Hochstein et al.
(Continued)

FOREIGN PATENT DOCUMENTS

CN 102558792 A 7/2012
WO 2010/103215 A1 9/2010

OTHER PUBLICATIONS

G. Coughlin et al.: "New UV Absorber for PET Packaging: Better Protection With Less Discoloration," Journal of Plastic Film and Sheeting, 2008, pp. 227-238, vol. 24, Sage Publications (http://jpf.sagepub.com/content/24/3-4/227).
(Continued)

*Primary Examiner* — Michael F Pepitone
(74) *Attorney, Agent, or Firm* — John H. Hornickel

(57) ABSTRACT

A composition to protect beta-carotene from visible light photo-oxidation is disclosed. The composition uses a combination of a quinophthalone dye, a pyrazolone dye, and a methine dye to protect the beta-carotene from visible light in the range of 400-500 nm.

12 Claims, 3 Drawing Sheets

(56) References Cited

U.S. PATENT DOCUMENTS

| | | | | |
|---|---|---|---|---|
| 8,153,703 | B2 | 4/2012 | Laredo | |
| 8,575,296 | B2 | 11/2013 | Vernon et al. | |
| 9,310,538 | B2 | 4/2016 | Hohn et al. | |
| 2003/0183122 | A1* | 10/2003 | Ishida | B41M 5/345 106/31.27 |
| 2003/0204000 | A1 | 10/2003 | Jen | |
| 2005/0278871 | A1 | 12/2005 | Gourlaouen et al. | |
| 2010/0089289 | A1* | 4/2010 | Mahiat | C08J 3/2053 106/170.23 |
| 2010/0204395 | A1* | 8/2010 | Rajaraman | C08J 3/226 524/559 |
| 2012/0165422 | A1* | 6/2012 | Vernon | B29C 49/0005 521/138 |

OTHER PUBLICATIONS

ColorMatrix Europe Limited and the ColorMatrix Corporation: Marketing Efforts (2004).

The ColorMatrix Corporation: "Ultimate UV390" Product Literature (2011).

PolyOne Corporation: "ColorMatrix Ultimate UV Light Barrier for PET" Webpage (2015).

* cited by examiner

COMPOSITION FOR PROTECTING BETA-CAROTENE

CLAIM OF PRIORITY

This application claims priority from Chinese Patent Application Serial Number CN201210315827.2 filed on Aug. 30, 2012, which is incorporated by reference.

FIELD OF THE INVENTION

This invention concerns a thermoplastic composition of polyester and a specific combination of dyes which absorb visible light in the same wavelengths as does beta-carotene.

BACKGROUND OF THE INVENTION

Spoilage of food has been a problem for centuries. While the sun is the ultimate source of natural energy, whether currently radiant or previously stored, the wavelengths of sunlight in the electromagnetic spectrum cause photo-oxidation of photo-sensitive molecules in food or other ingestible chemicals such as vitamins, pharmaceuticals, etc.

Degradation via photo-oxidation can cause loss of therapeutic or caloric effectiveness, change of color, or change of taste. Use of colorants such green or brown colorants in glass is known as a means to reduce or diminish the effects of photo-oxidation for foods such as beer and fruit juices. The colorants are chosen to absorb visible light in the wall of the glass container in the same wavelength ranges as are absorbed by the photo-sensitive food ingredient(s).

SUMMARY OF THE INVENTION

Beta-carotene (β-carotene) is the most well-known pro-vitamin A carotenoid and is a key ingredient to good human nutrition. Beta-carotene contributes to the orange color of many different fruits and vegetables, such as pumpkins, carrots, spinach, sweet potatoes (yams), and collards.

Placing foods containing beta-carotene into plastic vessels of any type (bottles, containers, pouches, etc.) is a common way of transport and storage until use. To the extent that the vessel is transparent, a preference currently in the display of food offered for sale and during subsequent storage, the transmission of visible light through a transparent plastic vessel can be quite detrimental to the nutritional value, coloration, and taste of beta-carotene in the food in the plastic vessel. This is true whether the light source is natural from the sunlight or artificial via incandescent or fluorescent lighting, although the intensity of natural sunlight is more harmful to photo-sensitive chemicals.

It is known that beta-carotene has very strong absorption in visible light wavelength range of 400 nm-500 nm, with prominence of two peaks of greater absorption at 447 nm and 492 nm.

What the art needs is a colorant which can absorb in the range of 400 nm-500 nm to protect beta-carotene from photo-oxidation when in transparent or translucent plastic vessels.

The present invention has found a particular combination of colorants to provide that protection from photo-oxidation of beta-carotene in transparent plastic vessels containing food which includes beta-carotene.

One aspect of the present invention is a composition for protection of beta-carotene within a plastic vessel, comprising: (a) polyester; (b) a quinophthalone dye; (c) a pyrazolone dye; and (d) a methine dye; wherein beta-carotene absorbs visible light in the range of 400 nm-500 nm and wherein the combination of the quinophthalone dye, the pyrazolone dye, and the methine dye absorb visible light in the range of 390 nm-480 nm. Preferably, the composition also includes an ultra-violet light absorbing chemical to protect the polyester.

Another aspect of the present invention is a plastic vessel made from the composition of claim 1.

Another aspect of the present invention is a method of using dyes to protect beta-carotene within a plastic vessel, comprising the steps of: (a) mixing polyester, a quinophthalone dye, a pyrazolone dye, and a methine dye to form a composition; (b) shaping the composition into the plastic vessel; (c) placing a liquid containing beta-carotene into the plastic vessel; wherein beta-carotene absorbs visible light in the range of 400 nm-500 nm and wherein the combination of the quinophthalone dye, the pyrazolone dye, and the methine dye absorb visible light in the range of 390 nm-480 nm.

Embodiments of the invention are identified below, with reference to the following drawings.

EMBODIMENTS OF THE INVENTION

Polyester Resin

Figure 1:
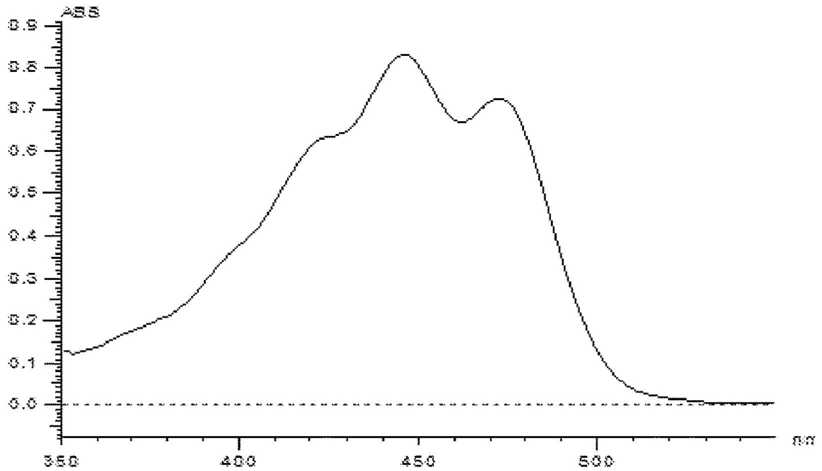
FIG. 1 is a graph of the absorption of beta-carotene in visible light.

Flexible and rigid packaging, bottles, containers, and other vessels for transport and storage of food often are made from polyester. Any polyester is a candidate for use in this invention.

For the transport and storage of food, those polyester resins which have been approved for food contact by national or regional governments are particularly preferred.

Any polyester is a candidate for use in the present invention. The formation of a polyester from a monool or a polyol and an acid or its ester encompasses many different suitable types of polyesters for use in this invention. The monomeric units can be formed reactions of either aliphatic moieties, aromatic moieties, or both. Desirably, the polyester is transparent or semi-transparent in order to accentuate the effect of the stress forming event.

Non-limiting examples of polyesters include terephthalates, terephthalate glycols, lactides, (hydroxy)alkanoates, copolyesters of terephthalic acid residues, 2,2,4,4-tetramethyl-1,3-cyclobutanediol, and 1,4-cyclohexanedimethanol, etc., or combinations thereof.

Additionally, one can use homopolyesters or copolyesters, such as homopolymers and copolymers of terephthalic acid and isophthalic acid. The linear polyesters may be produced by condensing one or more dicarboxylic acids or a lower alkyl diester thereof, e.g., dimethylterephthalate, terephthalic acid, isophthalic acid, phthalic acid, 2,5-, 2,6-, or 2,7-naphthalene dicarboxylic acid, succinic acid, sebacic acid, adipic acid, azelaic acid, bibenzoic acid and hexahydroterephthalic acid, or bis-p-carboxyphenoxyethane, with one or more glycols, e.g., ethylene glycol, pentyl glycol, and 1,4-cyclohexanedimethanol.

Of these various polyester candidates, because of commercial availability, the terephthalates, such as polyethylene terephthalate (PET) or polybutylene terephthalate (PBT), the lactides, such as polylactic acid (PLA), and the hydroxyalkanoates, such as polyhydroxybutyrate (PHB) or polyhydroxybutyrate-co-valerate (PHBV), are desirable for use. PET is currently preferred because of its ubiquity and cost, although PLA and PHBV are emerging as bio-derived thermoplastic polyesters which can supplant PET in whole or in part in certain markets.

Protective Colorants

Because beta-carotene absorbs light in wavelengths in the range of 400 nm-500 nm, the invention requires at least one colorant which absorbs light in the same or similar wavelength range.

Unexpectedly, it has been found that three specific colorants, organic dyes of different chemistries, provide the range of absorption sufficiently protective of beta-carotene, that their placement into polyester resin results in nearly total absorption of light in the wavelength from 400 nm to 500 nm. Stated another way, the three organic dyes resident in the polyester resin in the plastic vessel block the transmission of light in the wavelengths from 400 nm to 500 nm before such light can reach the beta-carotene and cause harm photo-oxidation.

The first organic dye is a quinophthalone dyestuff which absorbs visible light at 420-460 nm. One commercially available dye is Macrolex™ Yellow G Solvent Soluble dye from Lanxess of Germany.

The second organic dye is pyrazolone dyestuff which absorbs visible light at 390-420 nm. One commercially available dye is Macrolex™ Yellow 3G dye, also from Lanxess.

The third organic dye is methine dyestuff which absorbs light at 420-480 nm. One commercially available dye is Macrolex™ Orange R dye, also from Lanxess.

As the examples will demonstrate below, all three dyes are required to provide blockage of transmission of visible light of 400-500 nm. As the examples will also demonstrate, very small quantities of such dyes are enough to provide effective blockage of visible light transmission at such wavelengths.

Optional UV Light Absorber

Conventionally, ultraviolet (UV) light protection has been provided for thermoplastics in a variety of uses, because the thermoplastic resin itself is sensitive to ultraviolet light. Optionally, but preferably, any plastic vessel of polyester resin can benefit from the addition of a UV light absorbing chemical to protect the polyester resin.

Any UV light absorbing chemical is a candidate for use in this invention, so long as the chemical chosen does not interfere with the performance of the three organic dyes selected for visible light protection in the 400-500 nm range.

A commercially available UV light absorbing chemical is 2-(2-Hydroxy-3,5-di-a-cumylphenyl)-2H-benzotriazole (CAS No. 70321-86-7) which absorbs at UV light 290-360 nm but transmits more than 95% of visible light at 460 nm. This chemical is sold by a number of companies under the UV-234 designation, one of them being Jinwei company of China.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Table 1 shows acceptable, desirable, and preferable ranges of ingredients useful in the present invention, all expressed in weight percent (wt. %) of the entire compound. The compound can comprise, consist essentially of, or consist of these ingredients.

TABLE 1

| Ingredient (Wt. Percent) | Acceptable | Desirable | Preferable |
|---|---|---|---|
| Polyester Resin | 79.34-99.91 | 84.57-99.83 | 99.7 |
| Quinophthalone dye | 0.02-0.06 | 0.03-0.05 | 0.04 |
| Pyrazolone Dye | 0.01-0.05 | 0.02-0.04 | 0.03 |
| Methine Dye | 0.01-0.05 | 0.02-0.04 | 0.03 |
| Optional UV Light Absorbing Chemical | 0.05-0.5 | 0.1-0.3 | 0.2 |
| Optional Additives | 0-20 | 0-15 | 0-10 |

Table 1 shows the final compound ingredients. The ingredients can be added into a reduced amount of the polyester resin to form a concentrate or masterbatch for later dilution or "letdown" into the remainder of the polyester resin. The ratio of letdown determines the amount of polyester resin for the carrier of the concentrate and the amount of polyester resin into which the concentrate is let down.

Processing

The preparation of compounds of the present invention is uncomplicated. The compound of the present can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a mixer that is also elevated to a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.elsevier.com), one can make articles of any conceivable shape and appearance using compounds of the present invention.

Of the many types of plastic vessels, self-supporting plastic containers, such as plastic bottles of various sizes, is a preferred shape of plastic vessel for the transport and storage of food containing beta-carotene, particularly juices or other beverages. Self-supporting containers are often made via stretch blow molding.

Stretch blow molding is a subset of conventional blow molding, often used in making containers. The final shape is achieved via one stage or two stages.

In a one stage blow molding, a "parison" is formed having some final dimensions (the "finish" such as the screw cap portion of the ultimate container) and nearly immediately then subjected to blow molding with a deliberate stretch of the non-final dimensions expanded to their intended shape. Depending on the design, the stretching occurs both in the axial direction of the parison and in the hoop or radial direction also.

In a two stage blow molding, a "preform" is formed via conventional injection molding and having some final dimensions (the "finish" such as the screw cap portion of the ultimate container) and the remainder having shrunken dimensions for convenience of transport and storage until final stress formation.

In the second stage, the preform is heated to an appropriate softening temperature and gas is used to deliberately stretch to its final intended shape. Depending on the design, the stretching occurs both in the axial direction of the preform and in the hoop or radial direction also.

The amount of deliberate stretching force applied, measured by the reduction in thickness in the preform to the final part can be described as the stretch ratio: wall thickness of preform divided by wall thickness of part.

The composition for protection of beta-carotene can be molded into a final container while undergoing expansion at stretch ratios ranging from about 1.5:1 to about 200:1, and preferably from about 3:1 to about 50:1.

Also, the length of the preform usually expands during blow molding to a final part length about 1:1 to about 200:1. For the examples, which follow, that longitudinal or axial expansion ratio is about 2:1.

Heated air is usually used in the stretch blow molding process, although other gases can be used.

It is known that polyester can be strengthened by stretch blow molding because the resulting strain is hardened into the plastic article after cooling. This strengthening in a container can assist in the storage of fluids having a high vapor pressure, such as carbonated soft drinks and the like.

The plastic vessel of polyester having high clarity approaching transparency retains its high clarity and near transparency. The addition of the protective colorants does not adversely affect the clarity at the amount of colorant present.

Usefulness of the Invention

Any plastic vessel containing any food containing beta-carotene can benefit from the present invention using the unique combination of organic dyes of three different chemistries.

The blockage of transmission of visible light in the wavelengths of 400 nm-500 nm protects the photo-sensitive beta-carotene from spoilage.

The Examples further explain this invention.

EXAMPLES

Four Comparative Examples and one Example demonstrate the unexpectedness of this invention. Comparative Example A was 100% food grade polyethylene terephalate. Comparative Example B introduced one of the three protective colorant organic dyes, without success. Comparative Example 3 and Comparative Example 4 introduced a second of the three protective colorant organic dyes, also without success. Only after all three protective colorant organic dyes were introduced was there success in a composition which blocked transmission of visible light in the range of 400-500 nm wavelengths.

Table 2 shows the formulations of Comparative Examples A-D and Example 1. Each of them was mixed in a high speed mixer at ambient temperature until all ingredients were well dispersed. Then the mixtures of each were melted and cast into a film having 400 micron thickness for testing of visible light transmission using a Perkin-Elmer UV-visible spectrometer.

TABLE 2

| Ingredient (Wt. %) | Comp. A | Comp. B | Comp. C | Comp. D | Example 1 |
|---|---|---|---|---|---|
| PET CR-8863 Powder (Hualei, China) | 100 | 99.8 | 99.875 | 99.75 | 99.7 |
| Jinwei UV-234 2-(2-Hydroxy-3,5-di-a-cumylphenyl)-2H-benzotriazole (Jinwei, China) (CAS No. 70321-86-7) -- Absorbs at 290-360 nm; 95% Transmission > 460 nm | | 0.2 | 0.1 | 0.2 | 0.2 |
| Macrolex Yellow G Solvent Soluble Quinophthalone dye (Lanxess, Germany) -- Absorbs at 420-460 nm. | | | 0.015 | 0.03 | 0.04 |
| Macrolex Yellow 3G Solvent Soluble Pyrazolone Dye (Lanxess) -- Absorbs at 390-420 nm. | | | 0.01 | 0.02 | 0.03 |
| Macrolex Orange R Solvent Soluble Methine Dye (Lanxess) -- Absorbs at 420-480 nm. | | | | | 0.03 |

FIG. 1 shows the UV-visible absorption spectrum of beta-carotene. Between 400 nm and 500 nm, absorption is evident with two peaks at 447 nm and 491 nm.

Figure 2:
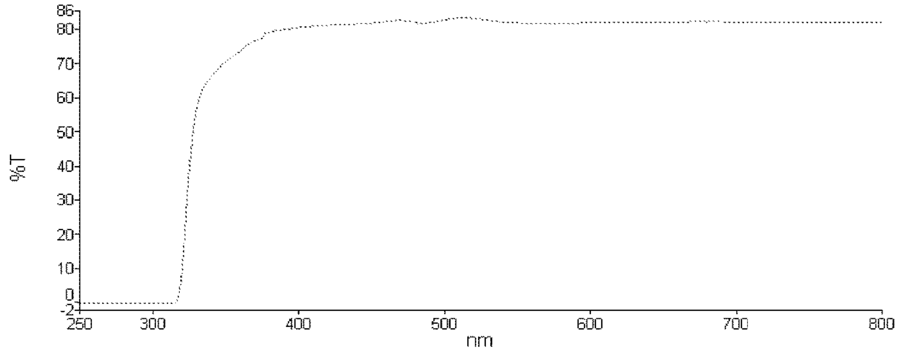
FIG. 2 is a graph of the transmission of light for Comparative Example A.

FIG. 2 shows the UV-visible transmission spectrum of Comparative Example A. In the UV wavelengths and well before the visible spectrum, polyester resin loses any ability to block transmission of visible light of any wavelength.

Figure 3:
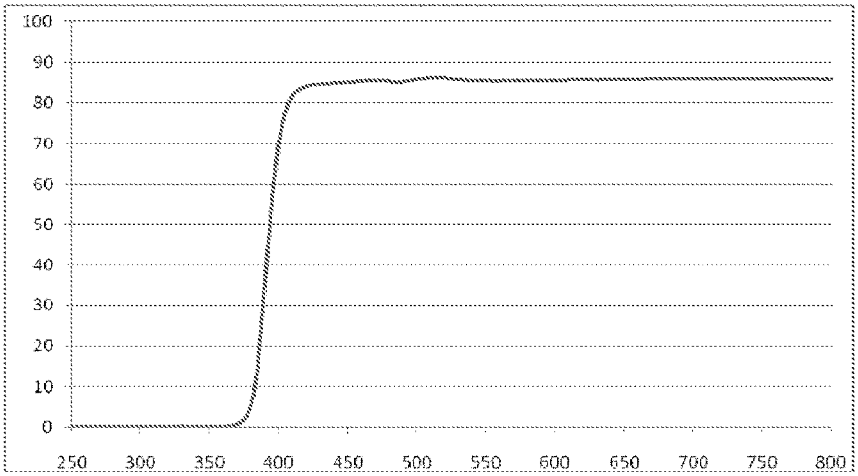
FIG. 3 is a graph of the transmission of light for Comparative Example B.

FIG. 3 shows the UV-visible transmission spectrum of Comparative Example B. The addition of benzotriazole in an amount of 0.2 weight percent provides protection until about 375 nm but almost total visible light transmission above 375 nm.

Figure 4:
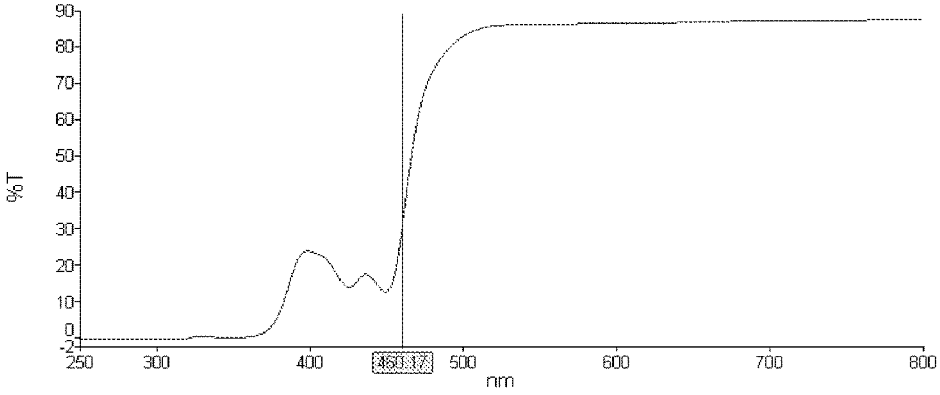
FIG. 4 is a graph of the transmission of light for Comparative Example C.

FIG. 4 shows the UV-visible transmission spectrum of Comparative Example C. The addition of both quinophthalone dye and pyrazolone dye in a total amount of 0.025 weight percent (10% of the amount of Comparative Example B) offers some transmission blockage in the range of 400-460 nm but almost total visible light transmission above 460 nm.

Figure 5:
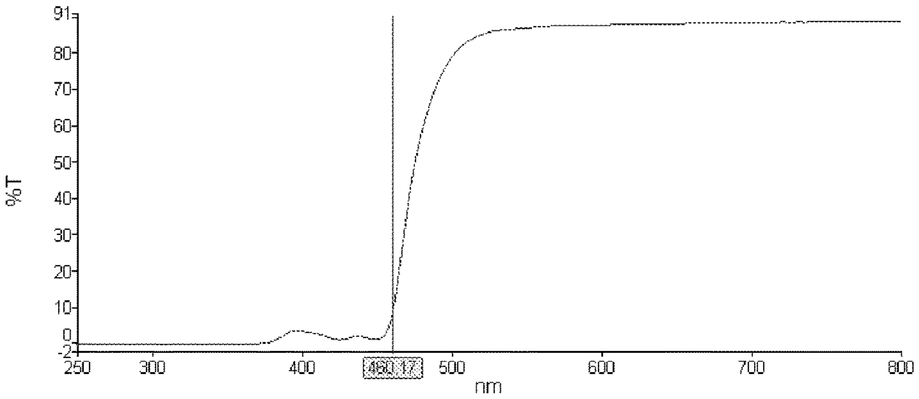
FIG. 5 is a graph of the transmission of light for Comparative Example D.

FIG. 5 shows the UV-visible transmission spectrum of Comparative Example D. The addition of both quinophthalone dye and pyrazolone dye in a total amount of 0.05 weight percent (twice the amount of Comparative Example C) offers considerably more transmission blockage in the range of 400-460 nm than Comparative Example C but almost total visible light transmission above 460 nm.

Figure 6:
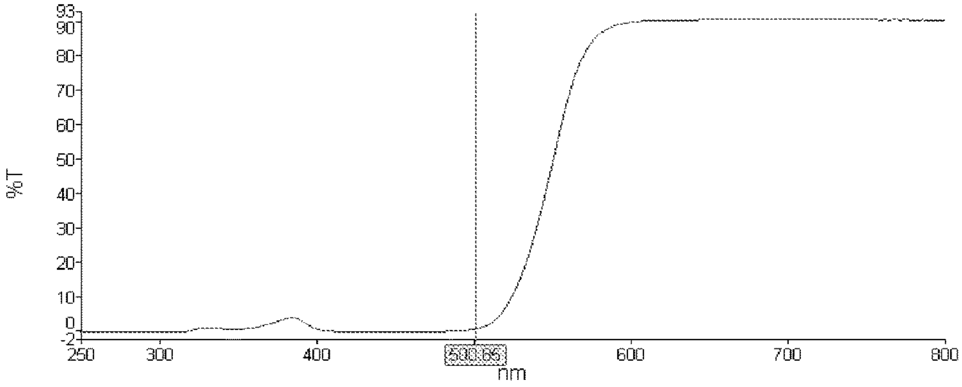
FIG. 6 is a graph of the transmission of light for Example 1.

FIG. 6 shows the UV-visible transmission spectrum of Example 1. The addition of all of quinophthalone dye, pyrazolone dye, and methine dye in a total amount of 0.1 weight percent (twice the amount of Comparative Example D) offers complete transmission blockage in the range of 400-500 nm, even though the methane dye is reported to absorb only to 480 nm. A plastic vessel such as a beverage container having liquid or solid food containing beta-carotene will protect the beta-carotene from photo-oxidation during transport or storage in conditions of natural or artificial visible light.

The invention is not limited to the above embodiments. The claims follow.

What is claimed is:

1. A composition for protection of beta-carotene within a plastic vessel, comprising:

(a) polyester;

(b) protective colorants consisting essentially of a quinophthalone dye, a pyrazolone dye, and a methine dye; and (c) an ultra-violet light absorbing chemical;

wherein beta-carotene absorbs visible light in the range of 400 nm-500 nm and wherein the combination of the quinophthalone dye, the pyrazolone dye, and the methine dye absorb visible light in the range of 390 nm-480 nm; and wherein the weight percent of ingredients of the composition are polyester resin=79.34-99.91;

quinophthalone dye=0.02-0.06;

pyrazolone dye=0.01-0.05;

methine dye=0.01-0.05;

ultra-violet light absorbing chemical=0.05-0.5; and optional additives=0-20.

2. The composition of claim 1, wherein the polyester is selected from the group consisting of terephthalates; terephthalate glycols; lactides; (hydroxy)alkanoates; copolyesters of terephthalic acid residues, 2,2,4,4-tetramethyl-1,3-cyclobutanediol, and 1,4-cyclohexanedimethanol; and combinations thereof.

3. The composition of claim 2, wherein the polyester is selected from the group consisting of polyethylene terephthalate (PET), polybutylene terephthalate (PBT), polylactic acid (PLA), polyhydroxybutyrate (PHB), polyhydroxybutyrate-co-valerate (PHBV), and combinations thereof.

4. The composition of claim 1, wherein the ultra-violet light absorbing chemical is 2-(2-Hydroxy-3,5-di-a-cumylphenyl)-2H-benzotriazole (CAS No. 70321-86-7).

5. The composition of claim 4, wherein the composition further comprises adhesion promoters; biocides; anti-fogging agents; anti-static agents; foaming agents; dispersants; fillers; flame retardants; smoke suppresants; impact modifiers; initiators; lubricants; micas; colorants; plasticizers; processing aids; release agents; slip agents; anti-blocking agents; stabilizers; stearates; viscosity regulators;

waxes; or combinations of them.

6. A plastic vessel made from the composition of claim 1.

7. The plastic vessel of claim 6, wherein the plastic vessel is selected from the group consisting of flexible packaging, rigid packaging, bottles, containers, and other vessels for transport and storage of food.

8. The vessel of claim 6, wherein the polyester is selected from the group consisting of terephthalates; terephthalate glycols; lactides; (hydroxy)alkanoates; copolyesters of terephthalic acid residues, 2,2,4,4-tetramethyl-1,3-cyclobutanediol, and 1,4-cyclohexanedimethanol; and combinations thereof.

9. The vessel of claim 6, wherein the polyester is selected from the group consisting of polyethylene terephthalate (PET), polybutylene terephthalate (PBT), polylactic acid (PLA), polyhydroxybutyrate (PHB), polyhydroxybutyrate-co-valerate (PHBV), and combinations thereof.

10. The vessel of claim 6, wherein the ultra-violet light absorbing chemical is 2-(2-Hydroxy-3,5-di-a-cumylphenyl)-2H-benzotriazole (CAS No. 70321-86-7).

11. The vessel of claim 6, wherein the composition further comprises adhesion promoters; biocides; anti-fogging agents; anti-static agents; foaming agents; dispersants; fillers; flame retardants; smoke suppressants; impact modifiers; initiators; lubricants; micas; colorants; plasticizers; processing aids; release agents; slip agents; anti-blocking agents; stabilizers; stearates; viscosity regulators; waxes; or combinations of them.

12. A method of using dyes to protect beta-carotene within a plastic vessel, comprising the steps of:

(a)

shaping the composition of claim 1 into the plastic vessel; and (b) placing a liquid containing beta-carotene into the plastic vessel;

wherein beta-carotene absorbs visible light in the range of 400 nm-500 nm and wherein the combination of the quinophthalone dye, the pyrazolone dye, and the methine dye absorb visible light in the range of 390 nm-480 nm.

* * * * *